United States Patent
Brewington et al.

(10) Patent No.: US 9,147,001 B1
(45) Date of Patent: Sep. 29, 2015

(54) AUTOMATIC USER-BASED QUERY GENERATION AND EXECUTION

(75) Inventors: Brian Brewington, Fort Collins, CO (US); Gregory Michael Blevins, San Francisco, CA (US); Guang Yang, San Jose, CA (US); Dale Hawkins, Erie, CO (US); Tushar Udeshi, Broomfield, CO (US); Steve Okamoto, San Jose, CA (US); Andrew Kirmse, Redwood City, CA (US); Gokay Baris Gultekin, Palo Alto, CA (US); Emil Praun, Union City, CA (US); Thomas Carl Stamm, Louisville, CO (US); David Singleton, London (GB); James A. Guggemos, Windsor, CO (US); Pablo Bellver, Redwood City, CA (US); Keir Mierle, San Francisco, CA (US); Erez Louider, Mountain View, CA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/586,804

(22) Filed: Aug. 15, 2012

Related U.S. Application Data

(60) Provisional application No. 61/665,234, filed on Jun. 27, 2012.

(51) Int. Cl.
*G06F 17/30* (2006.01)

(52) U.S. Cl.
CPC .................... *G06F 17/3087* (2013.01)

(58) Field of Classification Search
CPC .......... G06F 17/3087; G06F 17/30241; G06F 17/3064; G06F 17/30867
USPC .................. 707/710, 718, 724, 919, 767, 918
See application file for complete search history.

(56) References Cited

U.S. PATENT DOCUMENTS

| | | | |
|---|---|---|---|
| 8,595,186 B1 * | 11/2013 | Mandyam et al. ............ | 707/632 |
| 8,694,491 B2 * | 4/2014 | Jeh et al. ........................ | 707/722 |
| 2006/0206532 A1 * | 9/2006 | MacLaurin ................... | 707/707 |
| 2009/0282122 A1 * | 11/2009 | Patel et al. .................... | 709/207 |
| 2011/0173076 A1 * | 7/2011 | Eggleston et al. ......... | 705/14.66 |
| 2011/0202514 A1 * | 8/2011 | Singh ............................ | 707/706 |
| 2012/0306659 A1 * | 12/2012 | Ben-Dayan et al. ....... | 340/686.1 |
| 2012/0309363 A1 * | 12/2012 | Gruber et al. .............. | 455/414.1 |
| 2012/0310981 A1 * | 12/2012 | Lee et al. ...................... | 707/776 |

* cited by examiner

*Primary Examiner* — Robert Beausoliel, Jr.
*Assistant Examiner* — Alexandria Bromell
(74) *Attorney, Agent, or Firm* — Dority & Manning, P.A.

(57) ABSTRACT

Computer-implemented methods for generating and executing user-based standing queries are provided. In one aspect, a method includes determining whether to generate a notification based on a user-based query and geographical context. The method also includes filtering the notification through explicit or inferred filter criteria. Systems and machine-readable media are also provided.

15 Claims, 5 Drawing Sheets

AUTOMATIC USER-BASED QUERY GENERATION AND EXECUTION

CROSS-REFERENCE TO RELATED APPLICATIONS

The present application claims the benefit of priority under 35 U.S.C. §119 from U.S. Provisional Patent Application Ser. No. 61/665,234 entitled "AUTOMATIC USER-BASED QUERY GENERATION AND EXECUTION," filed on Jun. 27, 2012, the disclosure of which is hereby incorporated by reference in its entirety for all purposes.

BACKGROUND

1. Field

The present disclosure generally relates to automatically generating standing queries, and automatically executing standing queries based on triggers such as user location or user history.

2. Description of the Related Art

Applications such as trip planners, notification engines and search engines may provide information about items of interest to a user device (e.g., mobile device, personal computer, work computer). Standing queries (e.g., saved queries) may be set up by a user to provide updated information to a user or user device. The standing query may have a geographical parameter if the user requests it. For example, the user can explicitly create a standing query requesting a notification when a specific item goes on sale at a particular store location. The user can also request how often the standing query is run, e.g., daily, weekly, or as new results appear.

SUMMARY

According to one embodiment of the disclosure, a computer implemented method for executing a standing query having a geographical context is provided. The method includes determining a user location. The method also includes identifying, in a data repository, a standing query having a geographical context that matches the user location. The method further includes executing the standing query to identify responsive search results. The method also includes notifying the user of the search results.

According to another embodiment of the disclosure, a system for generating a notification associated with an inferred geographical context is provided. The system includes one or more memories configured to store instructions and one or more standing queries. The system also includes one or more processors, coupled to the one or memories and configured to execute the instructions stored thereon. The one or more processors execute the instructions in order to determine a user location and identify, in the one or more memories, a standing query having a geographical context that matches the user location. The one or more processors also execute the instructions in order to execute the standing query to identify responsive search results and notify the user of the search results.

According to a further embodiment of the disclosure, a non-transitory machine-readable storage medium comprising machine-readable instructions for causing a processor to execute a method for executing a standing query having a geographical context is provided. The method includes determining a user location, wherein the user location is a current location or an expected location determined by a user action. The method also includes identifying, in a data repository, a standing query having a geographical context that matches the user location. The method further includes executing the standing query to identify responsive search results, wherein the standard query is executed at predetermined times, at a time determined by a user action, or when the user location is determined. The method also includes notifying the user of the search results.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system generates a user notification based on a user's interest. The user may explicitly set up a standing query that is associated with a geographical context. Alternatively, the standing query may be automatically generated based on a user's actions without the user explicitly setting up the query. The geographical context can be a particular location, group of locations or any location that is otherwise responsive to the standing query. For example, the location can be the location of a particular store, or the location of any store in a chain of stores, or any location that matches the terms of the standing query. The system stores the query, and subsequently performs a search based on the query to search for information that meets the query criteria. The search may be run based on a trigger such as a predetermined time, or based on a trigger such as detecting a current user location, a user action, a frequency of a user action, or a user interest in a location. For example, the standing query can be run when the user checks-in to a location on a social network, or at predetermined times reflecting a frequency with which the user entered the search query prior to the system automatically saving the query as a standing query. After obtaining the search results, the system determines whether to notify the user. If the determination is positive, the system generates a notification and transmits the notification to a user device. The user device then presents the notification to the user. Alternatively, the system may determine not to run the query if the system determines that the user is not to be notified.

For instance, a user may set up a standing query to be notified when coming within one mile of a non-chain coffee shop having an average review score of at least four out of five stars and that the user has not previously visited. The system can infer (e.g., based on a request for driving directions), the user's current location and/or future location, and execute the standing query to identify responsive coffee shops. If the system finds a positive match, a notification is generated and transmitted to the user device, such as by a text message. The user can then decide to visit the coffee shop right then, save the information for a later time, or disregard the information as desired. The notification may also be filtered by either the system or the user device to prevent the user from being inundated with notifications if there are a lot of coffee shops that meet the criteria, or if the user is following a frequent travel pattern such as commuting to or from work. The system may also filter triggers for a standing query in order to prevent the query from being run in the first place. In the previous example of the frequent travel pattern of commuting to or from work, the filter may be that the user wishes notifications anytime except during the user's commute, and therefore the system does not run the query during the user's commute, even though the act of the user driving to another location may normally be a trigger to run the query.

As another example, the system may automatically generate a standing query to notify the user about discount flights to a particular location based on the user's recent query history indicating an interest in that location. The system may subsequently execute the standing query and notify the user of particular airline flight prices to that location either periodically or based on other inferred elements. For example, the system may determine that the user has previously issued queries for travel to that location only during specific times of year, such as Thanksgiving or Christmas. Consequently, the system may be triggered to execute the automatically generated standing query only around those times of year.

In yet another example, the system may automatically generate a standing query based on a user entry in a task application, such as an entry to buy milk. The system can subsequently execute the standing query when it determines the user is at or near a store that sells milk, and provide notification to the user. The system may take more factors into account when deciding whether to execute the standing query or provide user notification of query results, such as the likelihood of the user's desire to accomplish the task at a given time. To do so, the system may consider the time of day, the frequency of the user's previous visits to a particular store that is responsive to the query and entries in the user's calendar. Following the milk example, if the system determines that the user is near a store that has milk on sale at 7:00 PM on Wednesday night, and that there are no events on the user's calendar for that date and time, the system may infer that the user would likely want to accomplish the task of buying milk at that time, and send a notification to the user's phone that milk is on sale at the store.

While many examples are provided herein in the context of automatically generating and/or executing standing queries based on a user's interest, the principles of the present disclosure contemplate automatically generating and/or executing other types of standing queries as well. For example, a standing query can be automatically generated to notify a user if a person is nearby based on the user adding that person as a friend on a social network, or a standing query can be automatically generated to notify a user of recreational opportunities at a vacation location the user has entered on a calendar or for which a user has purchased plane tickets online.

Figure 1:
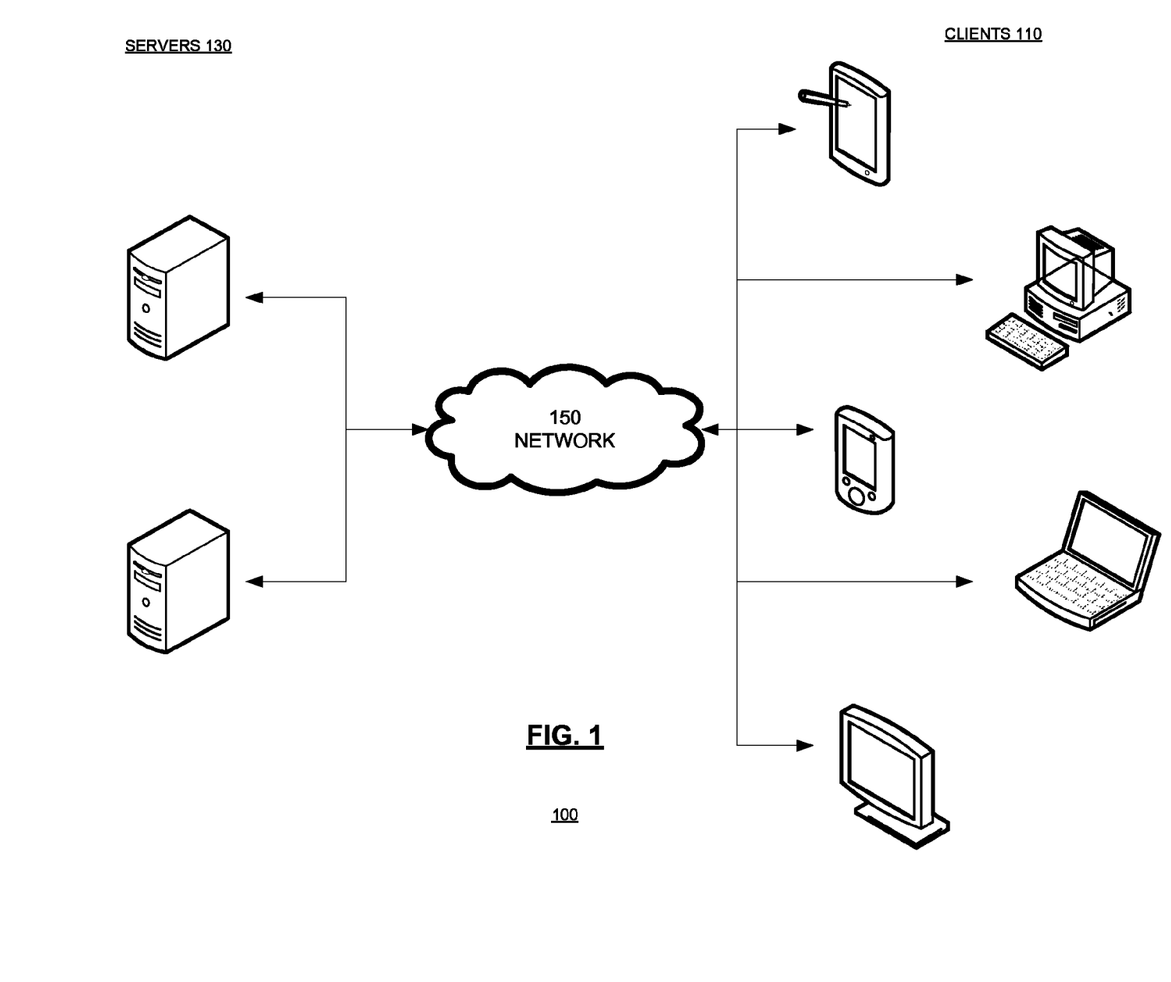
FIG. 1 illustrates an example architecture for automatically generating and executing user-based queries.

Turning to the drawings, FIG. 1 illustrates an example architecture 100 for a system that automatically generates standing queries for a user, and/or automatically runs standing queries (whether automatically generated or user generated) and notifies the user of the results. The architecture 100 includes servers 130 and clients 110 connected over a network 150.

Each of the clients 110 is configured to run an information interface (e.g., web browser or other application) that provides access to information related to standing queries and notifications from executing standard queries. The web browser or other application is configured to run on clients 110 that are mobile or non-mobile. The clients 110 can be, for example, desktop computers, laptop computers, mobile devices (e.g., smartphones, tablet computers, or PDAs), set top boxes (e.g., for a television), video game consoles, or any other devices having appropriate processor, memory, and communications capabilities.

The standard query notifications can be transmitted over the network 150 from one or more servers 130 to the user device 110. Multiple servers 130 can be used to automatically generate and/or execute standing queries, and to notify users of the results. Each of servers 130 can be any device having an appropriate processor, memory, and communications capability for automatically generating and/or executing standing queries, and providing notifications of query results. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
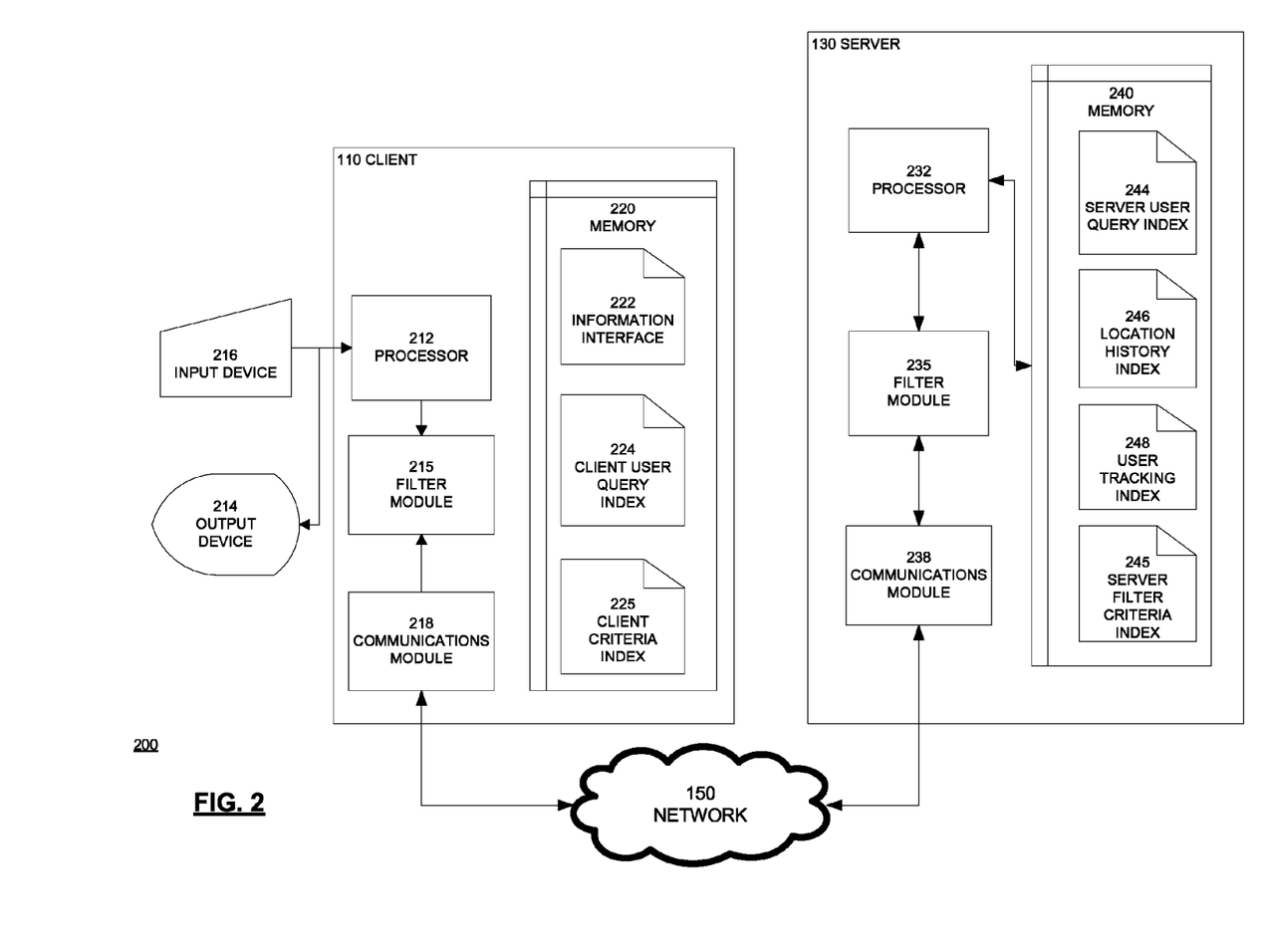
FIG. 2 is a block diagram illustrating an example client and server from the architecture of FIG. 1 according to certain aspects of the disclosure.

FIG. 2 is a block diagram 200 illustrating an example server 130 and client 110 that can be used in the system 100 of FIG. 1. The client 110 and the server 130 are connected over the network 150 via client communications module 218 and server communications module 238. The communications modules 218 and 238 are configured to interface with the network 150 to send and receive information, such as data, requests, responses, and commands to other devices on the network. The communications modules 218 and 238 can be, for example, modems or Ethernet cards and may be configured as transmitters and/or receivers.

The client 110 includes a client processor 212, the client communications module 218, and a client memory 220 that includes an information interface 222. The client memory 220 may also include a user query index 224 for storing information such as a user's standing queries and notification conditions. The client 110 also includes an output device 214, such as a display, to provide information to the user, and an input device 216, such as a keyboard, touchscreen, or mouse, to receive user inputs. Automatically executed standing query notifications are received from the server 130 over the network 150 using respective communications modules 218 and 238 of the client 110 and server 130. Specifically, the server 130 provides notification to the client 110 in response to automatically executing a standing query (whether user defined or automatically generated).

The server processor 232 of the server 130 is configured to execute instructions, such as instructions physically coded into the server processor 232, instructions received from software in the server memory 240, or a combination of both. For example, the server processor 232 executes instructions from the server memory 240 to automatically generate and/or run a standing query based on signals related to a user's present location or location history. The user's standing queries and/or or signals used to generate and/or run the user's standing queries may be stored in the server memory 240, received from other sources (e.g., other servers, sensors, clients), or a combination of both. For example, a standing query based on either explicit (i.e., user defined) or inferred (i.e., automatically generated) criteria may be stored in a user query index 244, a signal related to a location previously visited by the user may be stored in a user location history index 246, a signal related to the current geographical location of a user may be stored in a user tracking index 248, and another signal related to the user's purchasing history at a particular store may be provided by another server 130. The server processor 232 can use the stored signals to automatically generate and/or determine when to run the standing queries, determine if a notification should be generated and/or provided to the user based on the search results received in response to automatically executing the standing queries, and to provide notifications to the client 110. Alternatively, the client processor 212 may perform a portion of these actions (e.g. determining when to run a standing query), and or may store some or all of the signals used in these actions in the client memory 220.

Notifications of standing query results may be filtered by either a filter module 235 on the server 130 or a filter module 215 on the client 110. Filter modules 215, 235 use filter criteria that may be explicit (e.g., user specified parameters or current user location), inferred from user activity (e.g., user search or location history), or a combination of both. For example, filter criteria may include geographic location, time, date and day of the week, month, season, etc. Filter criteria may be stored on the server 130 in a server filter criteria index 245 or on the client 110 in a client filter criteria index 225. Notifications that do not meet one or more of the filter criteria may be prevented from being presented to the user. In one implementation, filter module 235 may prevent the notification from being transmitted to the client 110, thereby minimizing communications, bandwidth or resource costs. Alternatively, the notification may be transmitted to the client 110, but filter module 215 may prevent the notification from being presented to the user. Filtering may be used to prevent notifications from being presented to the user in areas that the user is likely to already know about, at times or in locations where the user is not likely to be able to act on them, or to simply prevent the user from being inundated by notifications. A filtered notification may be deleted, stored for later presentation to the user, or stored for use by another application. Filter module 235 may also prevent the system from running the standing query in the first place.

By way of example, a user may have a standing query requesting notification whenever a cup of French Vanilla Cappuccino is on sale at any coffee shop within 1 mile of the user's current location. However, the user may prefer not to receive such notifications in particular locations, such as between home and work, or during certain date/time frames, such as anytime after lunchtime or days the user works from home. Therefore, the user's smart phone filters out any notifications related to French Vanilla Cappuccino during the user's commute to work, after noon any day of the week, and all day Friday when the user always works from home. Alternatively, the system simply does not run the French Vanilla Cappuccino query during the user's commute to work, after noon any day of the week, and all day Friday when the user always works from home. Each standing query may have its own specific set of filter criteria that may be the same as or different from those of any other standing query.

Notifications that are filtered may then be presented to the user. The notifications may be presented in any desired form, such as a voice message, an audible alert, a vibration alert, an email message, a text message, an icon, a graphic image, a picture, a streaming video, or any combination thereof. The notification may be generated by a server 130 and received in presentation ready form by the client 110. Alternatively, the presentation ready form of the notification may be stored in the client 110 and then presented to the user upon receiving a signal from the server 130. The presentation ready form of the notification may also be generated by the client 110.

Figure 3:
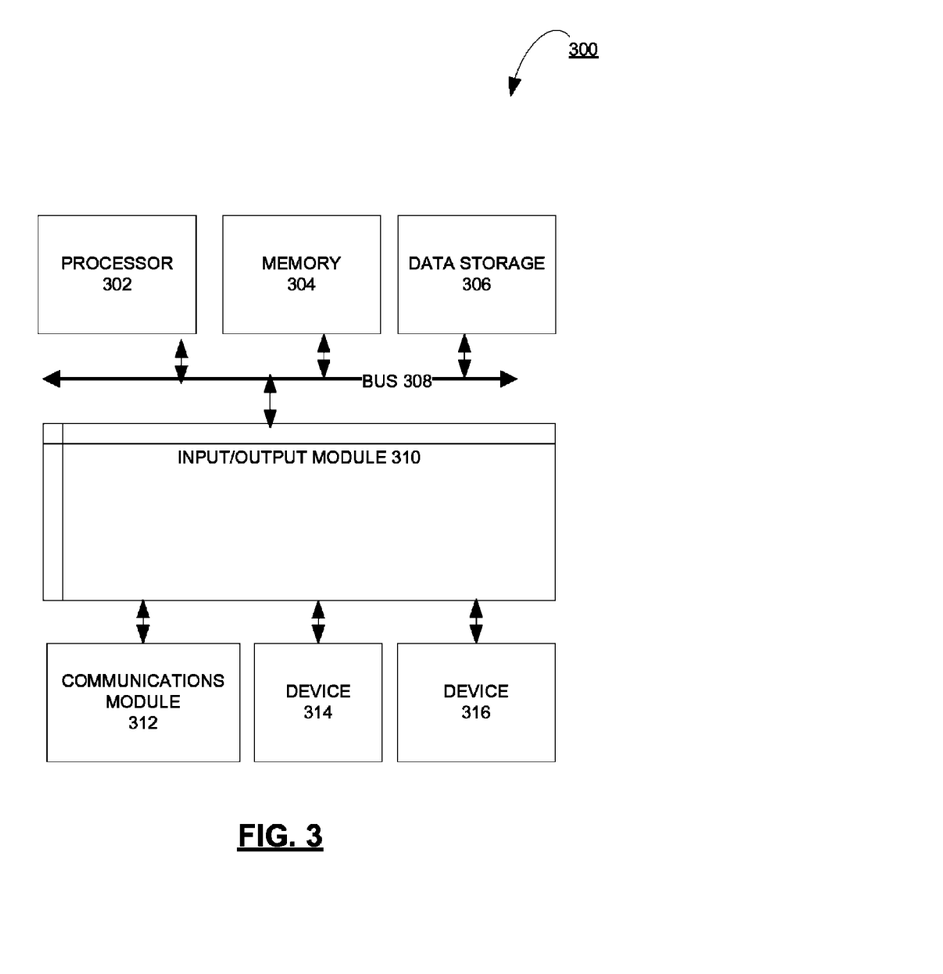
FIG. 3 is a block diagram illustrating an example computer system with which the client and server of FIG. 2 can be implemented.

FIG. 3 is a block diagram illustrating an example computer system 300 with which the client 110 and server 130 of FIG. 2 can be implemented. In certain aspects, the computer system 300 may be implemented using hardware or a combination of software and hardware, either in a dedicated server, or integrated into another entity, or distributed across multiple entities.

Computer system 300 (e.g., client 110 and server 130) includes a bus 308 or other communication mechanism for communicating information, and a processor 302 (e.g., processor 212 and 232) coupled with bus 308 for processing information. By way of example, the computer system 300 may be implemented with one or more processors 302. Processor 302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 300 can include, in addition to hardware, code that creates an execution environment for the computer program in question, e.g., code that constitutes processor firmware, a protocol stack, a database management system, an operating system, or a combination of one or more of them stored in an included memory 304 (e.g., memory 220 and 240), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 308 for storing information and instructions to be executed by processor 302. The processor 302 and the memory 304 can be supplemented by, or incorporated in, special purpose logic circuitry.

The instructions may be stored in the memory 304 and implemented in one or more computer program products, e.g., one or more modules of computer program instructions encoded on a computer readable medium for execution by, or to control the operation of, the computer system 300, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 304 may also be used for storing temporary variable or other intermediate information during execution of instructions to be executed by processor 302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 300 further includes a data storage device 306 such as a magnetic disk, solid state disk (SSD) or optical disk, coupled to bus 308 for storing information and instructions. Computer system 300 may be coupled via input/output module 310 to various devices. The input/output module 310 can be any input/output module. Example input/output modules 310 include data ports such as USB ports. The input/output module 310 is configured to connect to a communications module 312. Example communications modules 312 (e.g., communications modules 218 and 238) include networking interface cards, such as Ethernet cards and modems. In certain aspects, the input/output module 310 is configured to connect to a plurality of devices, such as an input device 314 (e.g., input device 216) and/or an output device 316 (e.g., output device 214). Example input devices 314 include a keyboard and a pointing device, e.g., a mouse or a trackball, by which a user can provide input to the computer system 300. Other kinds of input devices 314 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 316 include display devices, such as a CRT (cathode ray tube) or LCD (liquid crystal display) monitor, for displaying information to the user.

According to one aspect of the present disclosure, the client 110 and server 130 can be implemented using a computer system 300 in response to processor 302 executing one or more sequences of one or more instructions contained in memory 304. Such instructions may be read into memory 304 from another machine-readable medium, such as data storage device 306. Execution of the sequences of instructions contained in main memory 304 causes processor 302 to perform the process steps described herein. One or more processors in a multi-processing arrangement may also be employed to execute the sequences of instructions contained in memory 304. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component (e.g., a client computer having a graphical user interface or a Web browser) through which a user can interact with an implementation of the subject matter described in this specification, or any combination of one or more such back end, middleware, or front end components. The components of the system can be interconnected by any form or medium of digital data communication (e.g., a communication network). The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, a cloud and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 300 can include clients and servers. A client and server are generally remote from each other and typically interact through a communication network. The relationship of client and server arises by virtue of computer programs running on the respective computers and having a client-server relationship to each other. Computer system 300 can be, for example, and without limitation, a desktop computer, laptop computer, or tablet computer. Computer system 300 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 302 for execution. Such a medium may take many forms, including, but not limited to, non-volatile and volatile media. Non-volatile media include, for example, optical or magnetic disks, such as data storage device 306. Volatile media include dynamic memory, such as memory 304. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, or a combination of one or more of them.

Figure 4:
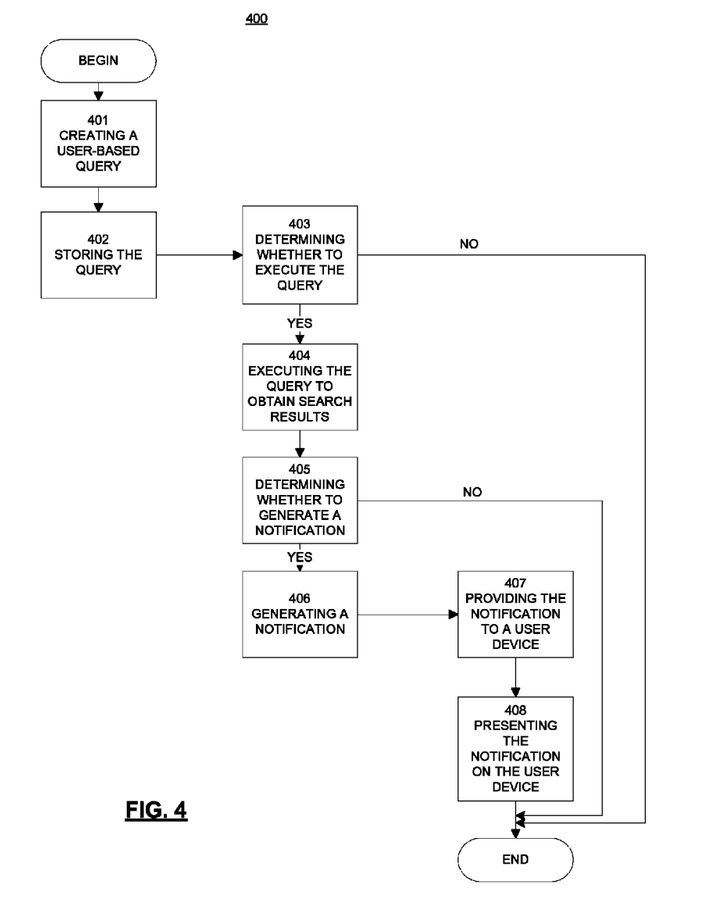
FIG. 4 illustrates an example process for automatically generating and executing user-based queries.

FIG. 4 illustrates an example process 400 using the example server 130 of FIG. 2 for generating and executing standing queries, and providing a notification to a user of the results obtained upon executing the queries. The process 400 begins at step 401 when a standing query is created. The standing query may be explicitly created by a user, or may be automatically created for the user by a server 130 or client 110. For example, as discussed above, a standing query may be automatically generated for pricing airline tickets to a location upon determining that a user has searched for information about the location more than a threshold number of times. In step 402, the standing query is stored in a memory. For example, the standing query may be created on server 130 and stored in server memory 240, created on client 110, and then sent to and stored in server memory 240, or created on client 110 and stored in client memory 220. In step 403, a decision is made whether to execute the standing query. The decision to execute the standing query may be based on triggers such as a geographical parameter associated with the user such as a current user location, or a future location of the user that is inferred from a user action. The user action may be, for example, frequent searching for information about the location, calendaring a meeting at the location, or adding a person who resides at the location to the user's social network.

In step 404, the standard query is executed, and search results are obtained. The standing query may use the geographical parameter associated with the user. For example, the standing query may search for all recently opened coffee shops within 5 miles of the user's current location or expected future location. The standing query may be executed at a particular frequency, such as once a day, or at a particular time of day, or upon detecting a particular user action or location. For example, a standing query for cheapest gas prices in town may be automatically generated upon detecting that the user has entered such a query more than a threshold number of times. The standing query may be automatically executed on a daily basis once it is generated. The frequency of execution may be determined from the frequency with which the user executed the query prior to the system automatically turning it into a standing query.

In step 405, the system determines whether to notify the user of the search results obtained from executing the standing query. As noted above, the determination can be based on various criteria, including the user's location, time of day, day of week, etc. The determination can also be based on whether the search results include any new results not previously seen by the user. For example, if the standing query is for the cheapest gas in town, the user may only be notified of the search results include a new gas station that has not previously been seen by the user, or if the order of gas stations offering the cheapest gas changes.

In step 406, a notification is generated, and provided to a client 110, such as a user device, in step 407. For example, the notification may be generated by server 130 and transmitted to client 110. The process 400 ends by presenting the notification on the client 110 in step 408. The presentation of the notification may be in a single format, such as a text message. Other notifications can be provided, however, such as the display of an icon on the client 110, or the delivery of a voice message. A combination of presentation formats may also be used, such as a vibration alert, an audible alert and a graphical image with text, for example.

Each of steps 401 through 407 may be performed by any combination of servers 130, clients 110 or computer systems 300. For example, all of steps 401 through 407 may be performed by a single server 130, or each of the steps may be performed by a different server 130.

To better illustrate the steps performed in FIG. 4, an example will now be described using a server 130, a server memory 240, a user-based query index 244, a user tracking index 248, a network 150, a smartphone client 110, an output device 214 and a mobile web browser 222.

The process 400 begins at step 401 when a user, e.g., using a mobile web browser 222 on the user's smartphone 110, creates a task to buy a movie when it goes on sale at a Movie Store. A server 130 automatically generates a standing query to find the movie on sale at the location of the Movie Store. In step 402, the server 130 stores the standing query in a user-based query index 244 in a server memory 240. In step 403, the server 130 executes the standing query stored in the user-based query index 244 in step 404. The server 130 can execute the standing query periodically (e.g., triggered once per day) or based on determining the user is currently close to the Movie Store (e.g., triggered based on receiving a user query indicating the user's current location). In this example, the server 130 determines upon executing the standing query that the desired movie is in stock and on sale for 20% off of list price. In step 405, the server determines whether to notify the user that the movie is on sale at the Music Store. If it does, it generates a notification in step 406, and provides the generated notification over the network 150 to the user's smartphone 110 in step 407. The process 400 ends in step 408 with the smartphone 110 presenting the notification to the user on the output device 214 (e.g., the smartphone display) in the form of a text message stating that the Movie Store has the desired movie on sale for 20% off.

Figure 5:
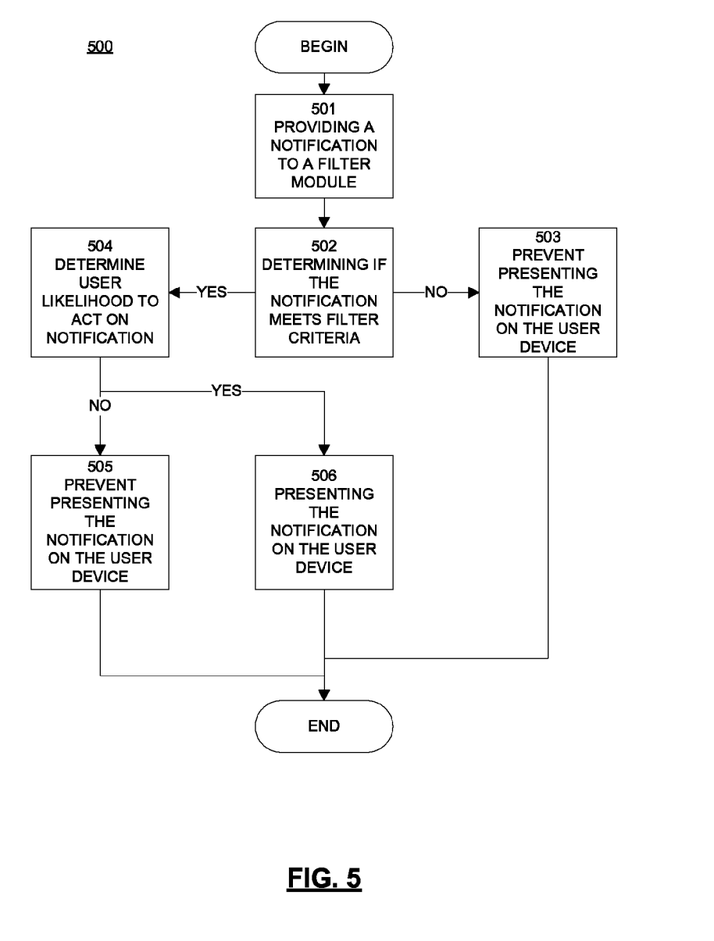
FIG. 5 illustrates another example process for automatically generating and executing user-based queries.

FIG. 5 illustrates an example process 500 using the example server 130 of FIG. 2 for filtering a notification. The process 500 begins at step 501 by providing a notification to a server filter module 235. In step 502, the filter module 235 determines whether the notification meets one or more filter criteria. If the notification does not meet one or more of the filter criteria, then the notification is not presented to a user in step 503.

If, on the other hand, the notification does meet the filter criteria, then the likelihood that the user will act on the notification can be estimated in step 504. The likelihood that the user will act on the notification may be based on criteria such as the time of day, the day of the week, the frequency of the user's previous visits to the relevant location, the user's calendar, and the price and/or availability of a service or an item, for example. Some of these criteria can be the same as the criteria used to filter the notification. For example, the notification can be rejected if it is a weekday, but permitted (filtered) if it is a weekend. Likewise, the likelihood that the user will act on the notification may be high if it is a Saturday, but low if it is a Sunday. If the user is not likely to act on the notification, then the notification is not presented to the user by the user device in step 505. If, on the other hand, the user is likely to act on the notification, then the notification is presented to the user by the user device in step 506. As noted above, notifications can be filtered by either the server filter module 235 or the client filter module 215. The client filter module 215 and the server filter module 235 may be used in combination as well. For example, the server filter module 235 may filter the notification through a particular set of filter criteria, then pass the notification on to the client filter module 215, which then filters the notification through a different set of filter criteria. The filtering process may be spread out over multiple servers 130 or computer systems 300 as well.

Further processing of the notification generated in the Movie Store example above will now be described using the example process 500 of FIG. 5, a server 130, a server filter module 235, a server filter criteria index 245, a network 150, a tablet client 110, a client filter module 215, a client filter criteria index 225 and an output device 214.

The process 500 begins at step 501 when a server 130 provides the notification (e.g., that the desired movie is on sale at the nearby Movie Store) to a server filter module 235. In step 502, the server filter module 235 determines if the Movie Store notification meets the user specified filter criteria that the user wishes to receive notifications regarding the desired movie anytime except while commuting to and from work or while at work. If the Movie Store notification is generated during the user's commute to work (e.g., between 8 am and 9 am on Monday through Friday), then the server filter module 235 does not send the notification over the network 150 to the user's tablet client 110 in step 503. If, on the other hand, the Movie Store notification is generated during the weekend, then an estimation of the likelihood that the user will act on the notification is made in step 504. In this example, the notification is forwarded to the tablet client 110 and the client filter module 215 makes the likelihood determination. For example, the client filter module 215 can estimate that since the user's calendar indicates that the user is away for the weekend, the user is not likely to stop at the Movie Store to buy the movie. Thus, the client filter module 215 decides not to notify the user in step 505. On the other hand, if the client filter module 215 estimates that the user is likely to act on the notification, it is presented to the user via an email sent to the tablet client 110 and displayed on the output device 214 in step 506.

Systems, methods, applications, and machine-readable storage media for determining and providing a notification have been described. While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer implemented method for executing a standing query having a geographical context, the method comprising:
    determining, by one or more computing devices, a user location;
    identifying, by the one or more computing devices, in a data repository, a standing query having a geographical context that matches the user location, the standing query being automatically generated based on the user repeating an action a threshold number of times, the standing query being associated with a frequency at which to execute the standing query, the frequency at which to execute the standing query being determined based at least in part on the frequency with which the user repeats the action;
    executing, by the one or more computing devices, the standing query at the associated frequency to identify responsive search results; and
    providing for display, by the one or more computing devices, one or more notifications associated with the search results.

2. The method of claim 1, wherein the user location is a current location or an expected location determined by a user action.

3. The method of claim 1, wherein notifying the user of the search results further comprises determining whether to notify the user based on one or more filter criteria.

4. The method of claim 3, wherein the filter criteria comprise at least one of a geographic location, a time, a date, or a day of week.

5. The method of claim 1, wherein the geographical context of the standing query is one or more explicitly defined geographical areas.

6. The method of claim 1, wherein notifying the user of the search results comprises at least one of sending the user a voice message, an audible alert, a vibration alert, an email message, a text message, an icon, a graphic image, a picture or a streaming video.

7. The method of claim 1, wherein the user action specified at least one of a location or a query subject.

8. A system for generating a notification associated with an inferred geographical context, the system comprising:
    one or more memories configured to store instructions and one or more standing queries;
    one or more processors, coupled to the one or memories and configured to execute the instructions stored thereon in order to:
    determine a user location;
    identify, in the one or more memories, a standing query having a geographical context that matches the user location, the standing query being automatically generated based on the user repeating an action a threshold number of times, the standing query being associated with a frequency at which to execute the standing query, the frequency at which to execute the standing query being determined based at least in part on the frequency with which the user repeats the action;
    execute the standing query at the associated frequency to identify responsive search results; and
    provide for display one or more notifications associated with the search results.

9. The system of claim 8, wherein the user location is a current location or an expected location determined by a user action.

10. The system of claim 8, wherein to notify the user of the search results further comprises to determine whether to notify the user based on one or more filter criteria.

11. The system of claim 10, wherein the filter criteria comprise at least one of a geographic location, a time, a date, or a day of week.

12. The system of claim 8, wherein the geographical context of the standing query is one or more explicitly defined geographical areas.

13. The system of claim 8, wherein to notify the user of the search results comprises at least one of sending the user a voice message, an audible alert, a vibration alert, an email message, a text message, an icon, a graphic image, a picture or a streaming video.

14. The system of claim 8, wherein the user action specified at least one of a location or a query subject.

15. A non-transitory machine-readable storage medium comprising machine-readable instructions for causing a processor to execute a method for executing a standing query having a geographical context, the method comprising:
   determining a user location, wherein the user location is a current location or an expected location determined by a user action;
   identifying, in a data repository, a standing query having a geographical context that matches the user location, the standing query being automatically generated based on the user repeating an action a threshold number of times, the standing query being associated with a frequency at which to execute the standing query, the frequency at which to execute the standing query determined based at least in part on the frequency with which the user repeats the action;
   executing the standing query at the associated frequency to identify responsive search results; and
   providing for display one or more notifications associated with the search results.

* * * * *